United States Patent [19]
Talasani

[11] Patent Number: 6,149,253
[45] Date of Patent: Nov. 21, 2000

[54] VIDEO DISPLAY POSITIONING SYSTEM

[76] Inventor: Raghuram Reddy Talasani, 5055 Von Scheele Dr., #724, San Antonio, Tex. 78229

[21] Appl. No.: 09/067,141

[22] Filed: Apr. 27, 1998

[51] Int. Cl.[7] ....................................................... A47B 5/00
[52] U.S. Cl. .......................... 312/7.2; 248/371; 248/919; 108/8; 108/10
[58] Field of Search ..................... 312/7.2, 10.1, 312/249.13; 108/7, 8, 10, 141, 137; 248/917, 918, 919, 922, 131

[56] References Cited

U.S. PATENT DOCUMENTS

| | | | |
|---|---|---|---|
| 4,365,561 | 12/1982 | Tellier et al. | 108/7 |
| 4,635,894 | 1/1987 | Sammons | 248/558 |
| 4,659,048 | 4/1987 | Fahrion | 248/285 |
| 4,687,167 | 8/1987 | Skalka et al. | 248/919 X |
| 4,709,972 | 12/1987 | LaBudde et al. | 312/302 X |
| 4,714,025 | 12/1987 | Wallin et al. | 108/20 |
| 4,779,922 | 10/1988 | Cooper | 248/918 X |
| 4,880,270 | 11/1989 | Cooper | 297/188 |
| 4,921,302 | 5/1990 | Godwin | 108/10 X |
| 4,959,645 | 9/1990 | Balz | 340/825.72 |
| 5,041,770 | 8/1991 | Seiler et al. | 318/265 |
| 5,161,766 | 11/1992 | Arima | 297/174 X |
| 5,197,393 | 3/1993 | Yeakle | 108/7 X |
| 5,240,215 | 8/1993 | Moore | 248/278 |
| 5,339,750 | 8/1994 | Smies | 108/8 X |
| 5,450,800 | 9/1995 | Leonard | 108/7 |
| 5,503,086 | 4/1996 | Hoffman et al. | 108/141 X |
| 5,634,622 | 6/1997 | Pye | 248/371 |
| 5,732,922 | 3/1998 | Jeon | 248/371 |

Primary Examiner—Peter M. Cuomo
Assistant Examiner—Stephen Vu
Attorney, Agent, or Firm—Cox & Smith Incorporated

[57] ABSTRACT

A video display positioning and support system that permits the orientation of a video display towards the user with variations in vertical height, horizontal rotation, and angular tilt. The system includes actuators for each of the movements involved that are capable of control by way of a remote operating system. The system provides a platform upon which the video display may be placed. The platform may be tilted at an angle from the horizontal as controlled by an actuator positioned near the back of the platform. The platform may be rotated in a horizontal plane so as to direct the video display from side to side, by an actuator that turns the platform on a circular bearing track. The display platform is positioned on a support frame that is attached to a vertical lift actuator that raises and lowers the entire display. The lift actuator is attached to and supported by a base frame that holds a storage cabinet and has a number of wheels for easy movement of the complete system. The base frame, including the cabinet, have features that permit variations in the overall width of the frame so as to accommodate display devices of varying size. Finally, there are a number of safety features that prevent movement of the display device outside a specific range and distance or angle as well as devices that prevent movement when objects are inappropriately positioned nearby.

9 Claims, 9 Drawing Sheets

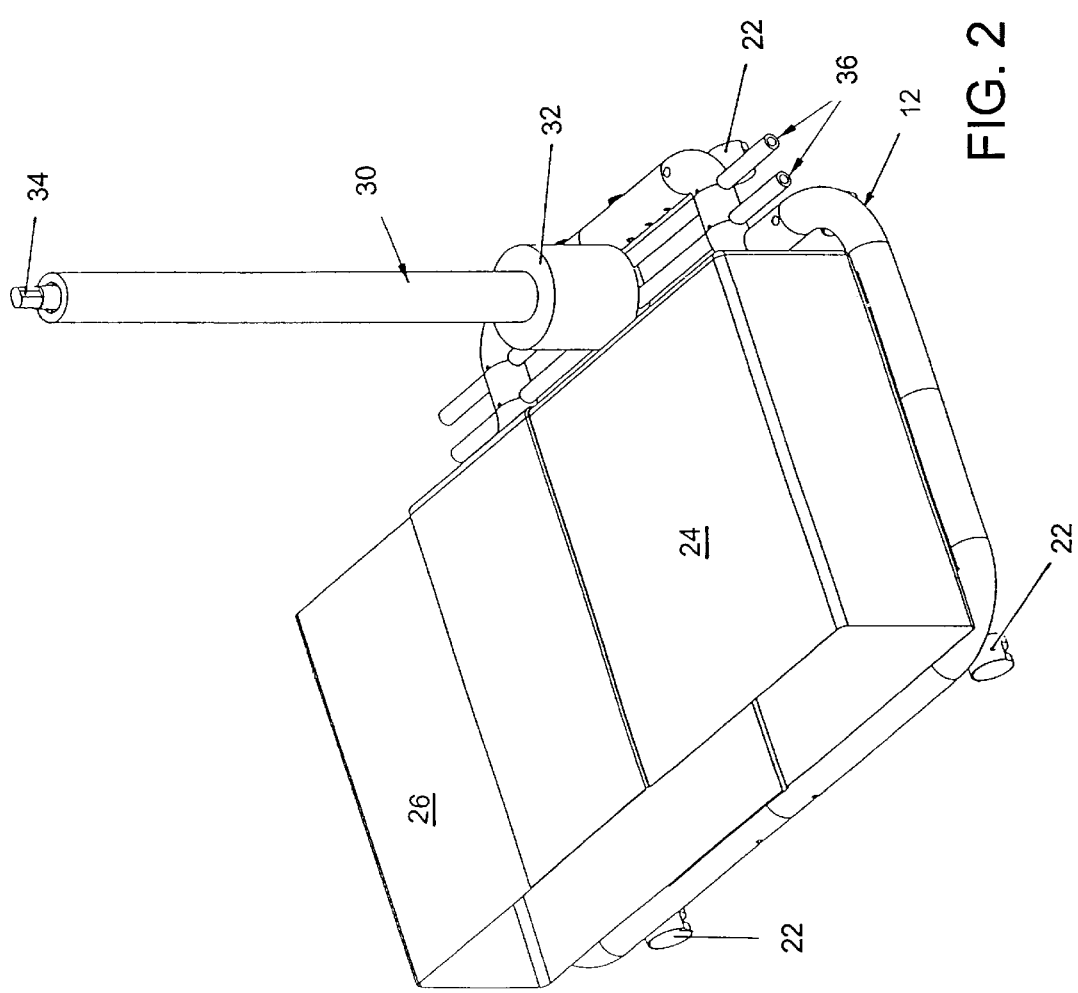

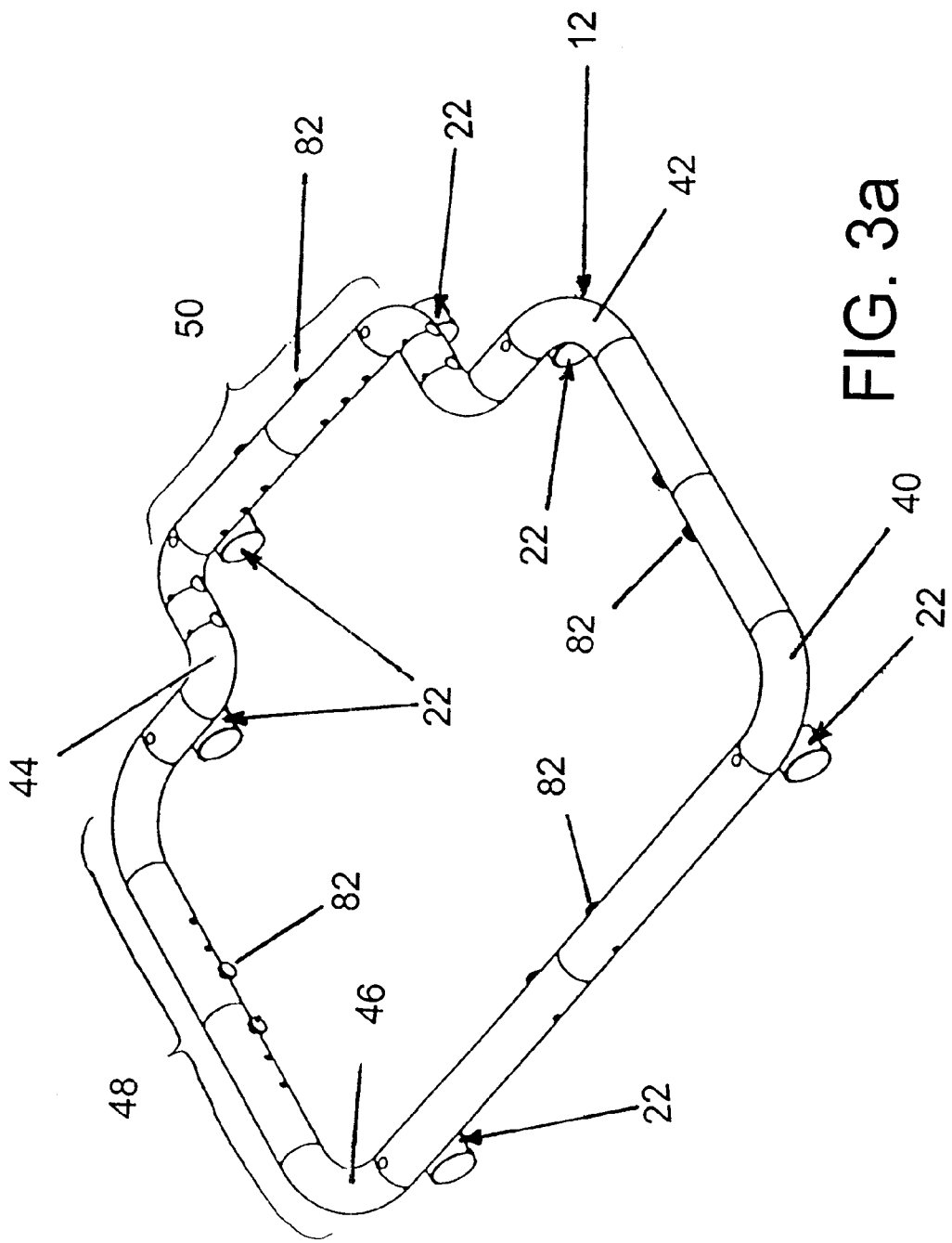

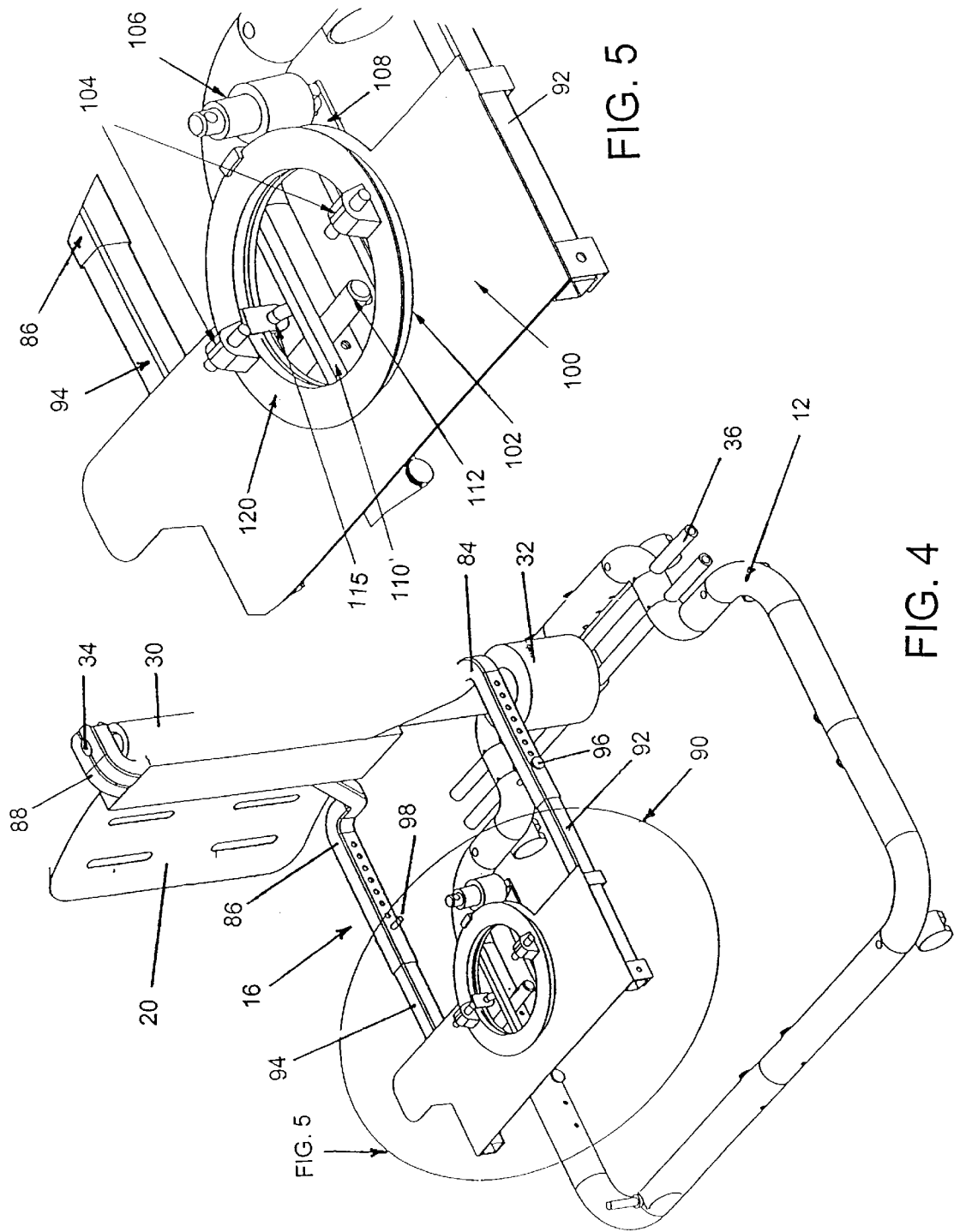

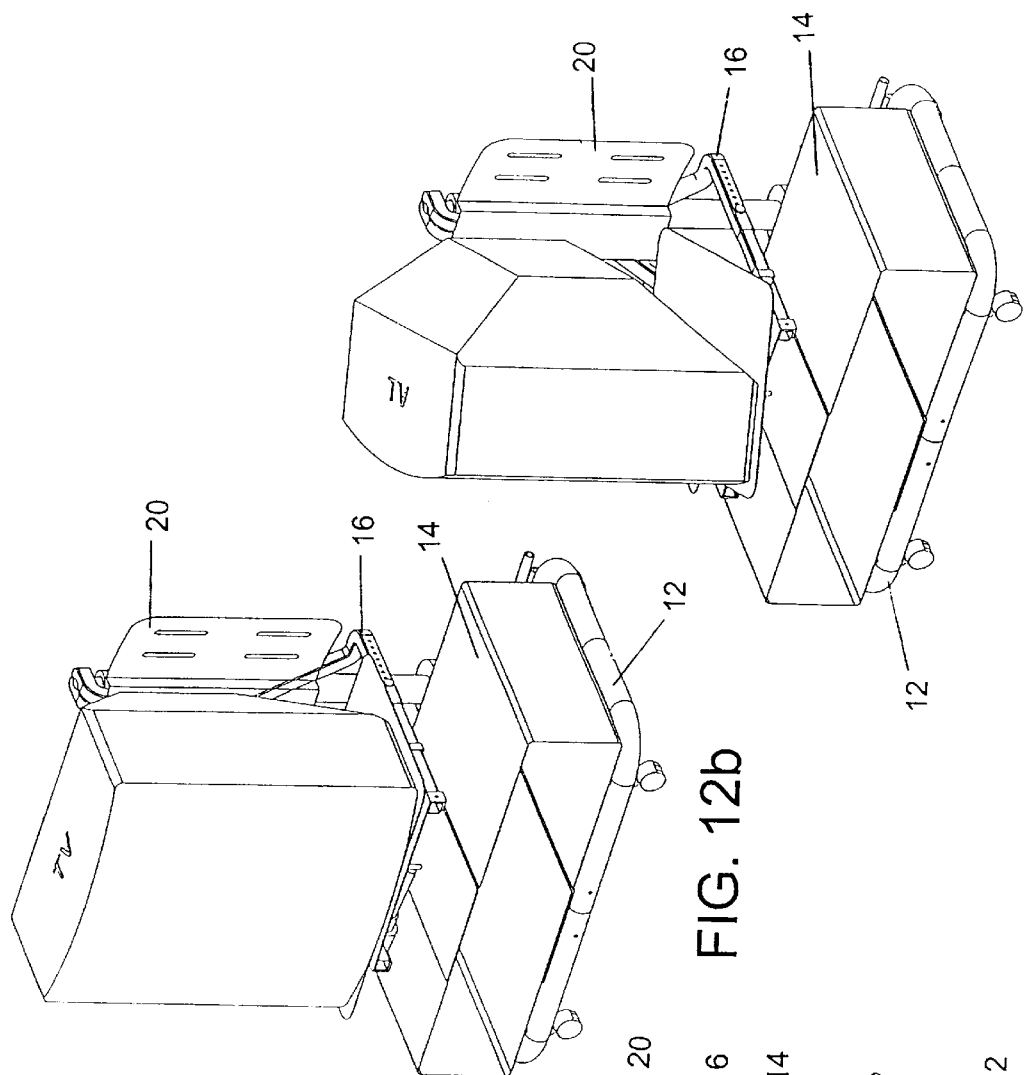
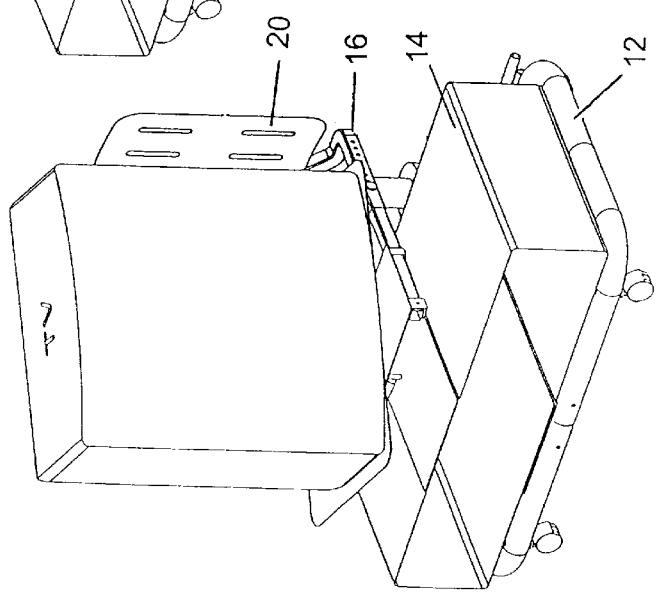

VIDEO DISPLAY POSITIONING SYSTEM

BACKGROUND OF THE INVENTION

1. FIELD OF THE INVENTION

The present invention relates generally to devices for the support and presentation of video display terminals and the like. The present invention relates more specifically to a device for supporting, positioning, and orienting a video display and manipulating the position and orientation of the display by means of a remote control system.

2. DESCRIPTION OF THE PRIOR ART

There are a large variety of video display devices commonly used in both home and commercial environments. The two best examples of such video display devices are television sets and computer monitors. These and other similar uses of video display devices require that the display be adequately supported and properly positioned for ease of viewing by a user. This is especially true for larger video display devices intended for viewing by more than one individual.

There have been many attempts in the past to provide devices and structures for the support, positioning, and orientation of televisions, computer terminals and the like. Most efforts in the past have sacrificed versatility for structural strength. Efforts to provide devices that permit variations in the position and orientation of the video display have generally been limited to movement in only one or at most two directions. There are a number of products available that permit the swivel motion of television set or computer monitor from side to side in order to accommodate horizontal variations in the viewer's perspective. There are also a number of products designed to permit variations in the vertical (tilt) orientation of a computer monitor (for example) although few of these devices translate easily into use with television sets and the like. Finally, there have also been attempts to provide devices for raising and lowering the entire video display according to the viewing level of the user. These latter types of lift devices are most often found in conjunction with floor mounted units and the like.

There have been some attempts in the past to combine positioning devices with remote controlled operation. As it is quite common to use infrared remote control devices in conjunction with the operation of television sets, it is not surprising that some products associated with the support and positioning of television sets are likewise implemented with remote control operations.

By way of example, the following patents identify some attempts in the past to provide both support and variations in orientation for a variety of video display devices.

U.S. Pat. No. 5,634,622, issued to Pye on Jun. 3, 1997, entitled Remote Controllable Television Viewing Stand. This patent describes a stationary, box-shaped television stand, capable of side to side horizontal movement as well as tilting vertical movement. These motions are controllable by means of an infrared remote control system connected to a pair of actuating motors coupled to the stand components by way of geared mechanisms. The device does not specifically address the raising and lowering of the video platform and is generally perceived to be a console piece of furniture as opposed to being mobile.

U.S. Pat. No. 4,635,894, issued to Sanmons on Jan. 13, 1987, entitled Multi-Purpose Furniture Swivel Assembly. This patent shows a television stand with a base compartment and a swiveling platform supporting a television set. The swiveling platform incorporates a circular bearing assembly that is pivotably attached to the platform. No tilt or lift is contemplated with this design.

U.S. Pat. No. 5,732,922, issued to Jeon on Mar. 31, 1998, entitled Monitor Support. This patent describes a support and positioning structure for a computer monitor whose primary purpose is to appropriately position speakers used in conjunction with the monitor. The support base includes a mechanism for the rotation of the monitor horizontally from side to side.

U.S. Pat. No. 4,365,561, issued to Tellier et al. on Dec. 28, 1982, entitled Computer Terminal Station for Data Input and Output. This design provides a keyboard platform that is not movable, in conjunction with a display platform that provides rotation, tilt, and vertical adjustments.

U.S. Pat. No. 4,659,048, issued to Fahrion on Apr. 21, 1987, entitled Supporting Device for a Data Displaying Unit. This table design provides a platform for a computer monitor that permits side to side rotation, tilt angle, and a horizontal slide that permits the movement of the entire monitor to an opposite end of the table.

U.S. Pat. No. 4,714,025, issued to Wallin et al. on Dec. 22, 1987, entitled Arrangement for a Switchboard Desk. This table incorporates a height-adjustable feature that comprises hydraulic cylinders on telescoping legs.

U.S. Pat. No. 4,880,270, issued to Cooper on Nov. 14, 1989, entitled Work Station System. This computer terminal station provides a chair from which a boom extends that holds two adjustable platforms, one for the keyboard of the computer and the second for the visual display. Various tilt capabilities are provided for both platforms.

U.S. Pat. No. 4,959,645, issued to Balz on Sep. 25, 1990, entitled Remotely Activated Television Base. This television swivel base is designed to receive a television set into a rectangular base with padded corner mounts and incorporates an infrared remote control system that permits rotational and vertical adjustment of the base.

U.S. Pat. No. 5,041,770, issued to Seiler et al. on Aug. 21, 1991, entitled Apparatus for Adjusting a Computer Work Station to Individual Needs. This computer table incorporates a number of adjustable platforms including one situated for the user's feet, one situated for the keyboard of the computer, and one that serves to position the display unit independently of the table platform. The adjusting mechanisms for the keyboard platform and the monitor platform are electrically controlled by the user. The monitor support has horizontal adjustments as well as ordinary tilt features.

U.S. Pat. No. 5,240,215, issued to Moore on Aug. 31, 1993, entitled Universal Computer Support Bracket. This design is intended for supporting a computer while in use in a vehicle such as a train. The bracket includes a channel to be mounted on a wall and a folding table support bracket. An independently movable platform is provided so as to allow pivoting and rotation to accommodate the appropriate orientation of the computer display.

U.S. Pat. No. 5,450,800, issued to Leonard on Sep. 19, 1995, entitled Ergonomically Adjustable Computer Workstation. This design incorporates a fixed base with a movable frame that permits vertical height adjustment, an actuator for display tilt adjustment, and structures for adjusting the rotational orientation of the video platform.

The prior art thus discloses efforts to position video display devices such as computer terminals and television sets according to three basic orientations. These orientations include vertical height adjustment (i.e., the raising and lowering of the overall display), rotational adjustment (the side to side horizontal orientation of the display), and tilt adjustment (the angle from the horizontal that the display is directed towards). Only a few of the devices described in the prior art attempt to combine all three movements into a single platform. Thus, many of the devices of the prior art fail to achieve the complete versatility that might be desired in a positioning system for a video display.

There are, in addition, a number of devices in the prior art that utilize remote control systems for operating positioning systems for the device. Most of these use infrared-based remote control systems. There are many more electrically controlled positioning devices that do not involve wireless remote operation. Most of the actuating mechanisms associated with these remote control devices are electrically operated, depending upon the movement of electrical motors, pulleys, gear systems, and the like. Most of these prior art designs achieve versatility in motion and positioning at the expense of overly complex gearing systems and excessively large electrical motors.

It would be desirable to have a video display positioning system that permitted movement in each of the three primary directional orientations and at the same time provided a means for varying such orientations according to remote operation. It would be desirable if the devices for implementing the movement and positioning in each of the three primary orientations were simple and straightforward in their structure and implementation. It would also be beneficial if such a device could easily accommodate a large variety of different video display systems both large and small in their geometries.

SUMMARY OF THE INVENTION

It is therefore an object of the present invention to provide a video display positioning system for computer monitors, television sets, and the like, that provides variable orientation of the display in a vertical height direction, a horizontal rotational direction, and an angular tilt direction.

It is a further object of the present invention to provide a support system for a video display device that is both lightweight and structurally sound.

It is a further object of the present invention to provide a support structure for a video display device that is configurable to accept and adequately support video display devices of a variety of dimensional and weight characteristics.

It is a further object of the present invention to provide a positioning system for a video display device capable of moving the device in a vertical height direction, a horizontal rotational direction, and an angular tilt direction by means of a remote controlled system.

It is a further object of the present invention to provide a video display positioning and support system whose positioning features are operable by electrical actuators capable of moving and orientating a platform on which the video display device is positioned.

It is a further object of the present invention to provide a video display positioning and support system that is vertically stable (i.e. does not tip over) when used in conjunction with a variety of heavy display devices.

It is a further object of the present invention to provide a video display support system that incorporates a storage cabinet that is also variable in size according to adjustments made to the overall system to accommodate different sizes of video displays.

It is a further object of the present invention to provide a video display positioning system that incorporates safety features to reduce the likelihood of accidental injury during use and/or movement of the positioning actuators.

In fulfillment of these and other objectives the present invention provides a video display positioning and support system that permits the orientation of a video display towards the user with variations in vertical height, horizontal rotational, and angular tilt. The system includes electrical actuators for each of the movements involved that are capable of control by way of a remote operating system. The system provides a platform upon which the video display may be placed, which platform may be tilted at an angle from the horizontal as controlled by an electrical actuator positioned near the back of the platform. The platform may be rotated in a horizontal plane so as to direct the video display from side to side, by means of an electrical actuator that turns the platform on a circular bearing track. The display platform is positioned on a support frame that is attached to a vertical lift actuator that raises and lowers the entire display. The lift actuator is attached to and supported by a base frame that holds a storage cabinet and has a number of wheels for easy movement of the complete system. The base frame, including the cabinet, have features that permit variations in the overall width of the frame so as to accommodate display devices of varying size. Finally, there are a number of safety features that prevent movement of the display device outside a specific range and distance or angle as well as devices that prevent movement when objects are inappropriately positioned nearby.

The above summary of the invention outlines in general terms the more important features of the present invention in order to facilitate an understanding of the invention as it may be derived from the following detailed description. Additional features of the invention are described below and form the subject matter of the claims that follow therefrom. It is understood that the invention is not limited in its application to the specific structures and arrangements of components as set forth herein or as illustrated in the drawings. The present invention is capable of a variety of embodiments carried out according to the overall approach described. In addition, the terms and measurements described herein are for the purpose of illustration and should not be regarded as limiting. Those skilled in the art will, upon a reading of the disclosure that follows, anticipate a variety of other structures that have the present invention as a basis for design. The claims that follow therefore should be read as to include such equivalent constructions insofar as they do not depart from the spirit and scope of the present invention.

BRIEF DESCRIPTION OF THE DRAWINGS

FIG. 2 is a perspective view of the base frame and lift actuator components of the present invention.

FIG. 3a is a perspective view of the base frame component of the present invention.

FIG. 4 is a perspective view of the system of the present invention shown without the display platform in place.

FIG. 5 is a detailed view of the display platform movement systems.

FIG. 12a is a perspective view of the present invention shown with a display device in place and rotated fully to the right.

FIG. 12b is a perspective view of the present invention shown with a display device in place and rotated to a center position.

FIG. 12c is a perspective view of the present invention shown with a display device in place and rotated fully to the left.

DESCRIPTION OF THE PREFERRED EMBODIMENT

The following is a description of the preferred embodiment of the present invention, especially as it might be used in conjunction with a typical television set in a home environment. It is understood that, though described in conjunction with a television set, the features of the present invention lend themselves to use in conjunction with other video display devices such as computer terminals and the like, as well as any object intended to be viewed by the user from a variety of perspectives. In other words, although the system is especially useful for the in viewing of video displays and the like, it is also possible to use the platform described to move and position other objects that may be based upon CRT (cathode ray tube) screens or even non-electronic/electrical devices. The system of the present invention may, for example, be used in its simplest form to support and position objects of art and the like intended for viewing by an audience. This system finds similar usefulness in conjunction with display devices such as oscilloscopes, advertising screens, background displays and video game displays. In similar fashion the positioning and support system of the present invention can be used as the platform from which the projection of images can occur. In other words, the platform might be used to position and support slide projectors, television projectors, overhead projectors and other such light or sound-based projection systems. The following embodiment is, therefore, but one example of the use of the present invention in conjunction with a viewable object such as a television set.

Figure 1:
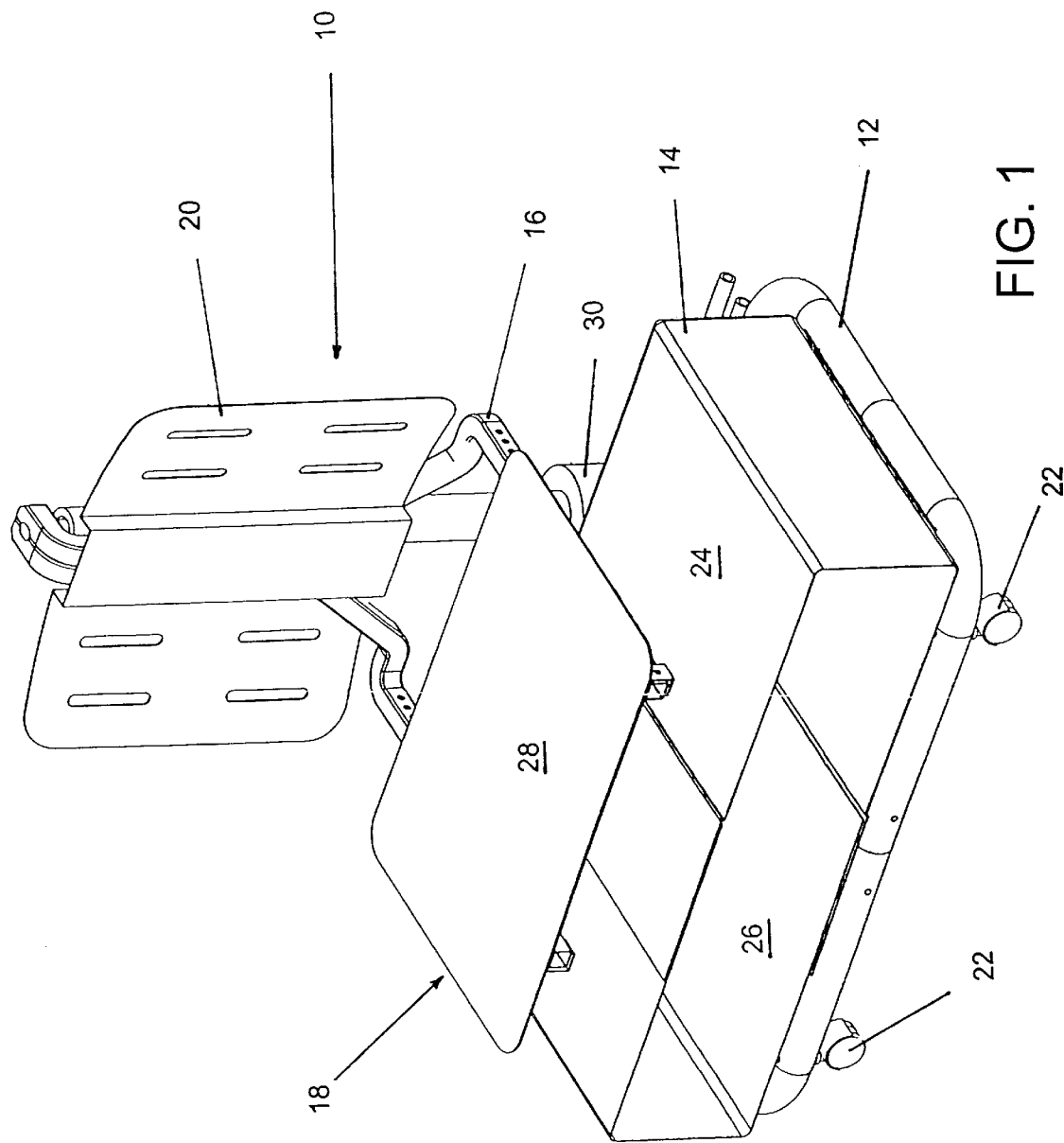
FIG. 1 is a perspective view of a preferred embodiment of the present invention disclosing the primary component groups thereof.

Reference is first made to FIG. 1 for a general description of the primary components of the positioning and support system of the present invention. Positioning system (10) is comprised of base frame (12) which supports base cabinet (14) and which is provided with base wheels (22) for ease of movement. Base cabinet (14) is comprised of outer cabinet shell (24) and inner cabinet shell (26), which slidably interact with each other so as to permit variations in the size of not only base cabinet (14), but also base frame (12) to which it is attached.

Extending from base frame (12) is lift actuator (30) which retains and positions support frame (16). Swivel support system (18) is held by support frame (16) and includes display platform (28). Safety shield (20) is positioned on support frame (16) in a manner that would partially surround a display device placed on display platform (28).

The overall structure of positioning system (10) is designed to be stable and to position the center of gravity of the combination of a display device with positioning system (10) above the center of base frame (12). In addition, as is described in more detail below, the structure of base frame (12) and base cabinet (14) are such that the overall width of the system can be varied according to the size of the display device placed on positioning system (10).

Reference is now made to FIG. 2 for a detailed description of base frame (12), base cabinet (14), and lift actuator (30). Base frame (12) is comprised of two primary sections. The first (forward) section supports base cabinet (14) while a second (rear) section supports lift actuator (30). Lift actuator (30) is comprised of lift actuator base (32) and lift actuator rod (34). In the preferred embodiment, lift actuator (30) is an electrically driven screw actuator that incorporates an electric motor within actuator base (32) and incorporates a helical screw that moves lift actuator rod (34) vertically in and out of lift actuator (30).

Lift actuator (30) is attached to and supported on base frame (12) by means of lift frame bars (36). Lift frame bars (36) are also designed to facilitate an ability to change the overall width of base frame (12) to accommodate a variety of different display devices.

Figure 3B:
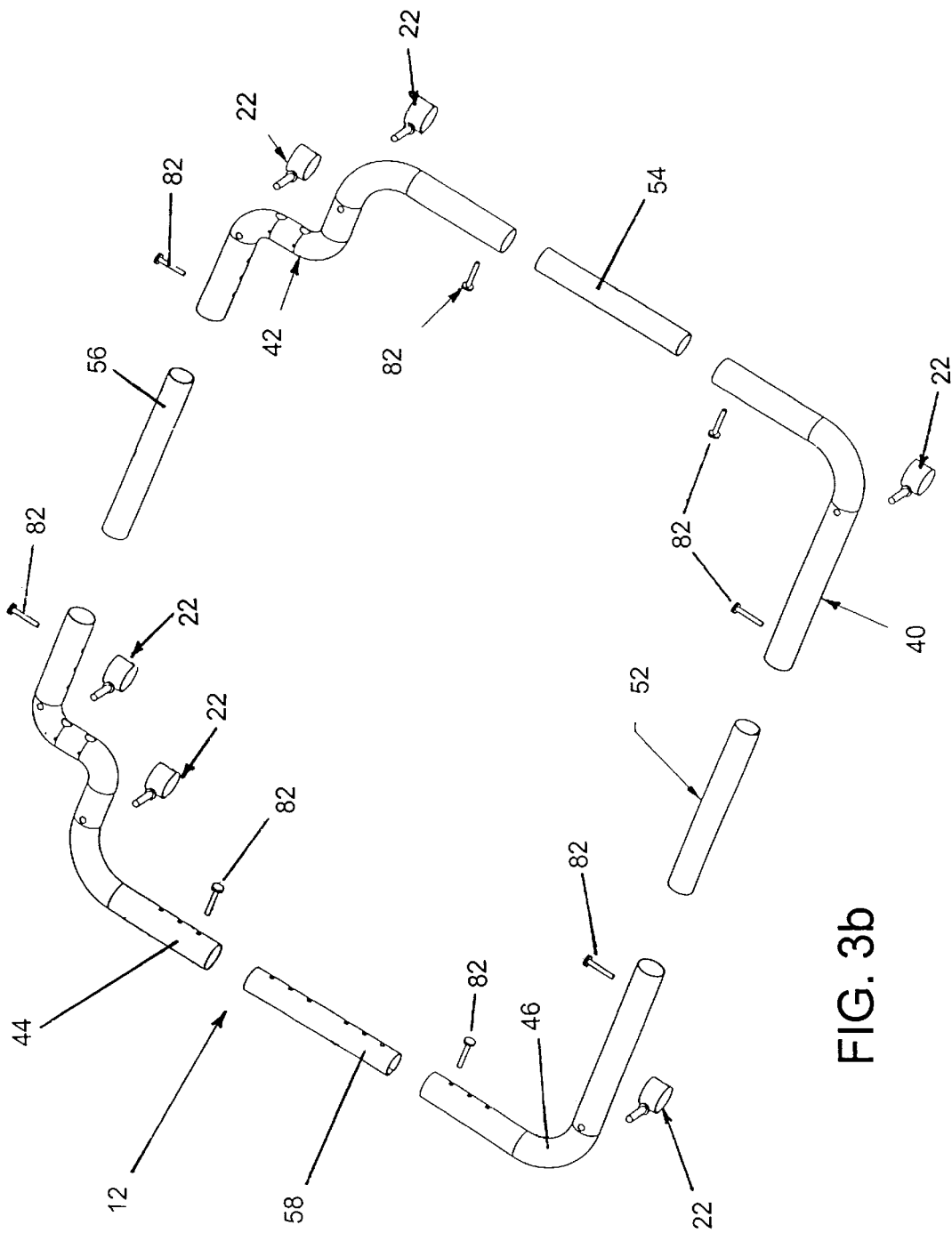
FIG. 3b is an exploded perspective view of the base frame component of the present invention.

Reference is now made to FIGS. 3a and 3b for more detailed description of the structure of base frame (12) and its ability to change in dimension according to the dimensions of the display device. As indicated above, base frame (12) is comprised of two primary sections. A first forward section, cabinet base frame (48) is designed to surround and support the base frame cabinet (not shown). A second rear section, lift base frame (50) is designed to accommodate the lift frame bars (not shown).

Base frame (12) is constructed of tubular components that may be easily detached one from the other and may further be expanded in order to extend the geometry of base frame (12) to accommodate larger or smaller display devices. FIG. 3a shows the assembled structure of base frame (12). Base frame (12) is comprised of four primary components as shown in FIG. 3a. Included among the four primary tubular components are right front frame corner (40), right rear frame corner (42), left rear frame corner (44), and left front frame corner (46). These four primary components are connected one to another as described in more detail below by means of set screws (82). In addition, each of right front frame corner (40) and left front frame corner (46) serve to retain a single base wheel (22). Each of right rear frame corner (42) and left rear frame corner (44) retain two such base wheels (22).

Reference is now made to FIG. 3b for a more detailed description of the means whereby base frame (12) is assembled and lends itself to geometric modification to accommodate larger and smaller display devices. In the exploded view shown in FIG. 3b, it is seen that there are tubular inserts positioned inside of each base frame component, which tubular inserts serve to connect the base frame components together and to permit their expansion to accommodate larger or smaller display devices. In particular, right front frame corner (40) is connected to right rear frame corner (42) by means of right frame expander (54). In a similar fashion, left front frame corner (46) is connected to left rear frame corner (44) by means of left frame expander (58). Right rear frame corner (42) is connected to left rear frame corner (44) by means of rear frame expander (56). Finally, right front frame corner (40) is connected to left front frame corner (46) by means of front frame expander (52).

Frame expanders (52), (54), (56), and (58) are tubular components having an outside diameter slightly less than the inside diameter of each of the frame corner components. This allows the frame expander components to slide within the frame corner components and to connect the frame corner components through the use of set screws (82). As best seen with left frame expander (58), each of the frame expanders has a plurality of holes therein capable of receiving set screws (82) in any of a number of positions. As can be readily seen from the exploded view shown in FIG. 3b, frame expanders (52), (54), (56), and (58) can slide more or less in and out of the frame corner components with set screws (82) inserted as desired when the dimensions of base frame (12) are suitable for the display device to be supported.

Because of the semi-rigid nature of the base frame components described above, it is anticipated that the dimensions for base frame (12) brought about by adjustments to right frame expander (54) and left frame expander (58) would be the same. Likewise, adjustments made to front frame expander (52) and rear frame expander (56) would be the same. This would maintain the overall rectangular geometry of base frame (12).

The mechanism whereby set screws (82) may be inserted into and retained by the frame corner and frame expander components as described above is well-known in the art. Threaded nuts may be permanently positioned within the frame expander components in order to receive and retain set screws (82) when inserted therein.

It should be noted that there are but three basic tubular components to the design of base frame (12) as shown in FIG. 3b. Right front frame corner (40) and left front frame corner (46) are in fact the same structural component as one may be simply flipped over to provide the appropriate structure for the other. Likewise, right rear frame corner (42) is identical in structure to left rear frame corner (44) and may be flipped over in order to serve as the other component. The third basic component is the frame expander typified by right frame expander (54) which in the preferred embodiment is identical in structure to each of the other frame expanders.

Reference is now made to FIG. 4 for detailed description of the components of the present invention that provide the three degrees of motion to the display device being supported. Base frame (12) is shown with lift frame bars (36) in place as they hold and support lift actuator (30). Lift actuator (30), through connections on lift actuator rod (34), holds and supports support frame (16). Support frame (16) is comprised of right support arm (84) and left support arm (86). Left and right support arms (84) and (86) are joined and connected to lift actuator (30) at support arm head (88). In this manner the vertical movement of lift actuator rod (34) raises and lowers support frame (16). Safety shield (20) extends and partially covers a portion of support frame (16) as right support arm (84) and left support arm (86) descend down from support arm head (88).

Held by support frame (16) is swivel base assembly (90) which is described in greater detail in conjunction with FIG. 5. Swivel base assembly (90) is connected to support frame (16) by way of right extension arm (92) which joins with right support arm (84) and is held in place by right extension set screw (96). Likewise, left extension arm (94) is connected to left support arm (86) and is held in place thereon by left extension set screw (98). Extension arms (92) and (94) are designed to telescope in and out of support arms (84) and (86) respectively and to be semi-permanently positioned in place according to the dimensions of the display device to be supported. The larger the display device (the deeper), the further out extension arms (92) and (94) will be positioned within support arms (84) and (86). Once positioned according to the dimensions of the display device, these arms would remain in place so as to appropriately position the center of gravity of the display device over the center of base frame (12).

FIG. 5 shows in greater detail the various components of swivel base assembly (90) that permit two of the three degrees of motion provided by the present invention. Swivel base assembly (90) is comprised primarily of swivel base platform (100) that is attached to and supported by extension arms (92) and (94). Positioned on swivel base platform (100) is bearing track (102) shown with swivel ring (120) positioned atop it. Swivel ring (120) incorporates a pair of pivot hinges (104) to which the display platform (not shown) is attached. Tilt actuator (106) provides a third point of attachment for the display platform. Tilt actuator support (108) appropriately holds and positions tilt actuator (106) to receive the display platform.

Swivel ring (120) rotates on bearing track (102) on ball bearings as is well known in the art. Bearing track (102) is structurally supported by means of swivel braces (110) which extend across an otherwise open aperture in swivel base platform (100). Through this aperture extends swivel ring connector (126) which hold swivel connector rod (115) as described in more detail below. Swivel connector rod (115) is connected to swivel actuator rod (112) and provides the connections necessary for the rotational movement of swivel ring (120).

Figure 6:
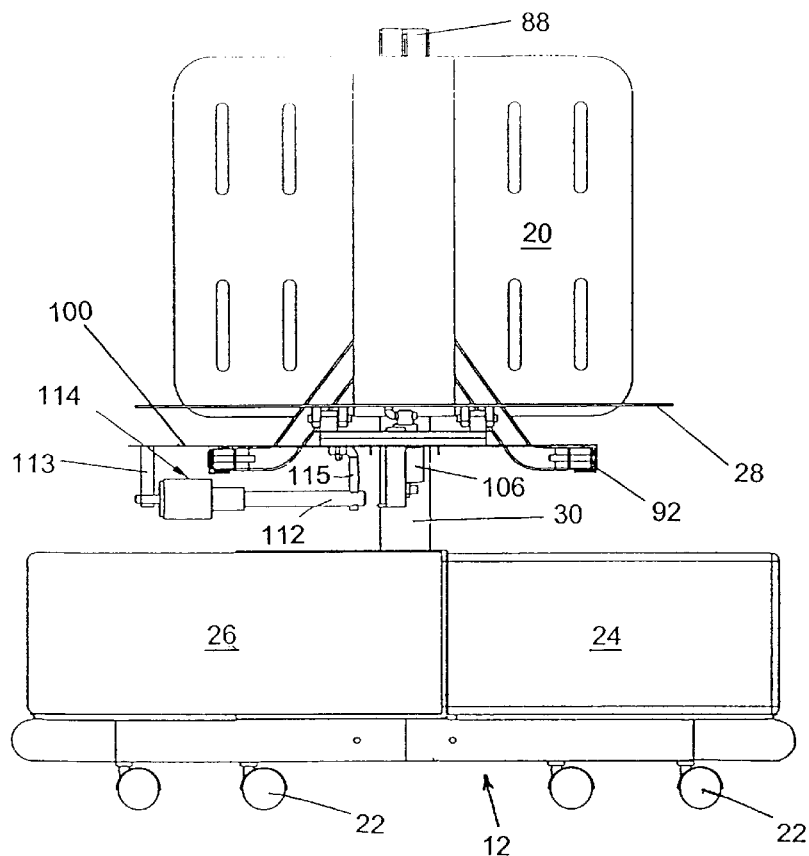
FIG. 6 is a front plan view of the positioning system of the present invention.

Reference is now made to FIG. 6 for a description of the mechanisms of the present invention as seen in a front view of the device. Display platform (28) is shown in place on swivel base assembly (90) connected as described above at pivot hinges (104). Beneath display platform (28) is swivel base platform (100) shown as it is supported by extension arms (92) and (94). Swivel connector rod (115) is shown as it is attached to swivel actuator rod (112) which extends back to swivel actuator (114). Swivel actuator support (113) holds actuator (114) in place beneath swivel base platform (100). In this manner the movement of swivel actuator (114) causes the extension or retention of swivel actuator rod (112) in a manner that pushes or pulls swivel connector rod (115) horizontally from side to side as viewed in FIG. 6. In reality, actuator (114), which is pivotally mounted to swivel actuator support (113), causes swivel connector rod (115) to follow a circular path base upon the track of swivel ring (120). As swivel actuator rod (112) extends out of swivel actuator (114), swivel ring (120) rotates in a clockwise direction (as viewed from above). When swivel actuator rod (112) is drawn back into swivel actuator (114), then swivel ring (120) is rotated in a counterclockwise direction.

Like the other actuators of the present invention, swivel actuator (114) is an electrically driven helical screw that causes swivel actuator rod (112) to move in and out as an electrical motor rotates the helical screw.

Also seen in FIG. 6 is tilt actuator (106) as it is attached to display platform (28) at the rear of swivel ring (120). Further shown in FIG. 6 is the nesting of inner cabinet shell (26) within a expanded portion of outer cabinet shell (24). In this manner, as adjustments are made in base frame (12), cabinet shell (26) may move in and out of cabinet shell (24) and still provide a complete enclosure for storage.

Figure 7:
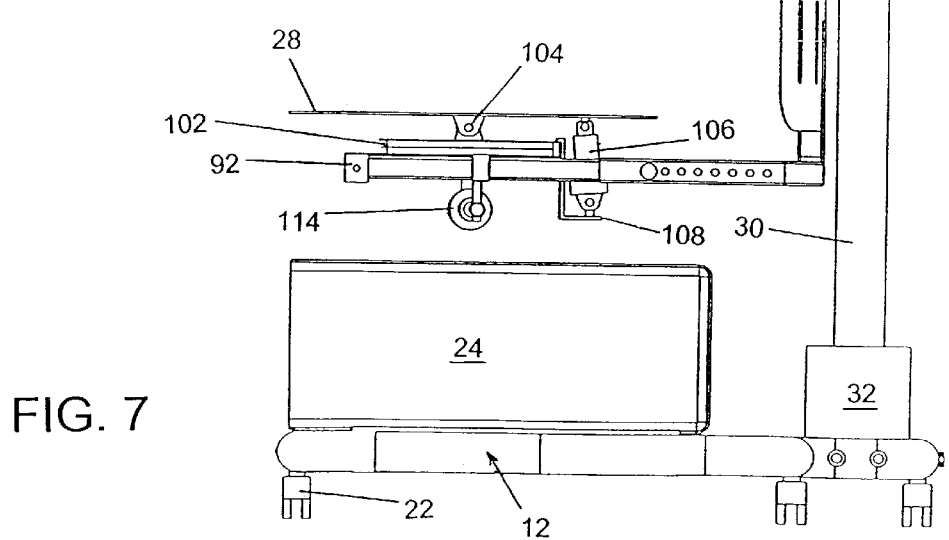
FIG. 7 is a side plan view of the positioning system of the present invention.

Reference is now made to FIG. 7 for a continued description of the positioning components of the present invention.

In FIG. 7, it can be better appreciated how the center of gravity of a display device placed on display platform (28) will be positioned immediately over the center of base frame (12). It can also be appreciated how the motion of lift actuator (30) raises and lowers the entire support frame (16) as well as swivel base assembly (90) which supports and positions the display device. Best seen in FIG. 7 is tilt actuator (106) attached at a third attachment point to display platform (28). Pivoting on pivot hinges (104), display platform (28) may be tilted forward or back by the movement of tilt actuator (106). Tilt actuator (106) is retained on swivel ring (120) by way of tilt actuator support (108). In this manner, regardless of the horizontal orientation of display platform (28) from side to side, tilt actuator (106) will still provide a tilt angle to the platform.

Figure 8:
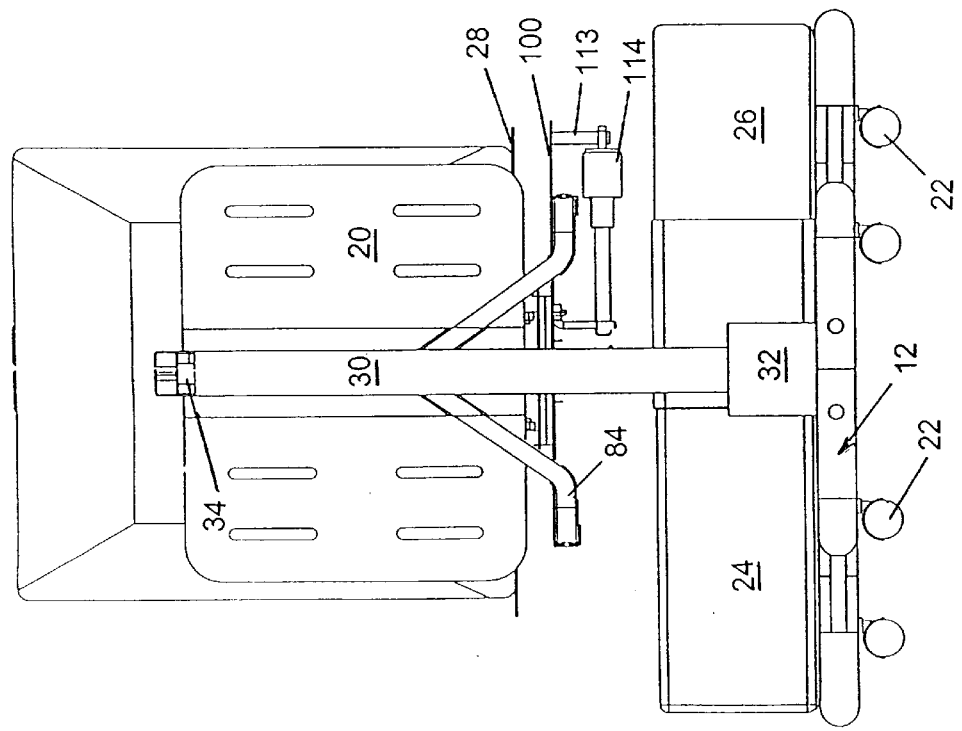
FIG. 8 is a rear plan view of the positioning system of the present invention shown with a display device in place on the display platform.

Reference is now made to FIG. 8 for a description of the components of the present invention as viewed from the rear of positioning system (10). In this configuration and view, the outer cabinet shell (24) and inner cabinet shell (26) are again shown as they are nested in telescoping fashion with each other. Lift actuator (30) is shown as it extends up from base frame (12) to hold support frame (16) at support arm head (88). Safety shield (20) is shown as it is positioned on support frame (16) covering the backside of the display device. For clarity, the display device is shown in place on display platform (28) in both FIG. 8 and FIG. 9. Once again, swivel actuator (114) which controls the horizontal side to side rotation of the display device is shown as it is positioned beneath swivel base platform (100).

Figure 9:
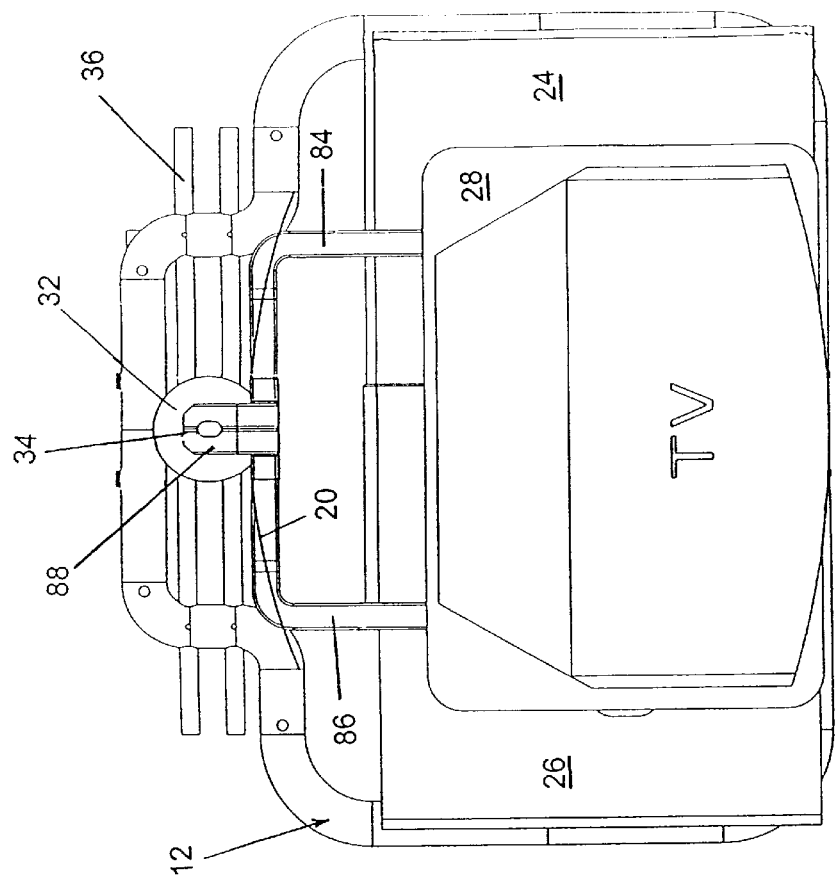
FIG. 9 is a top plan view of the positioning system of the present invention shown with a display device in place on the display platform.

FIG. 9 is a top plan view showing the display device in place on display platform (28) and showing in better detail the relative position of the display device with respect to safety shield (20). In this view it can be appreciated how some rotation of display platform (28), and the display device thereon, is permitted without either coming in contact with safety shield (20). Safety shield (20) does prevent external objects from coming too close to the rear side of the display device and generally defines the extent of the rotational side to side movement of the display device while in operation. In this manner, foreign objects are not permitted to come in too close contact with the rear faces of the display device.

Figure 10:
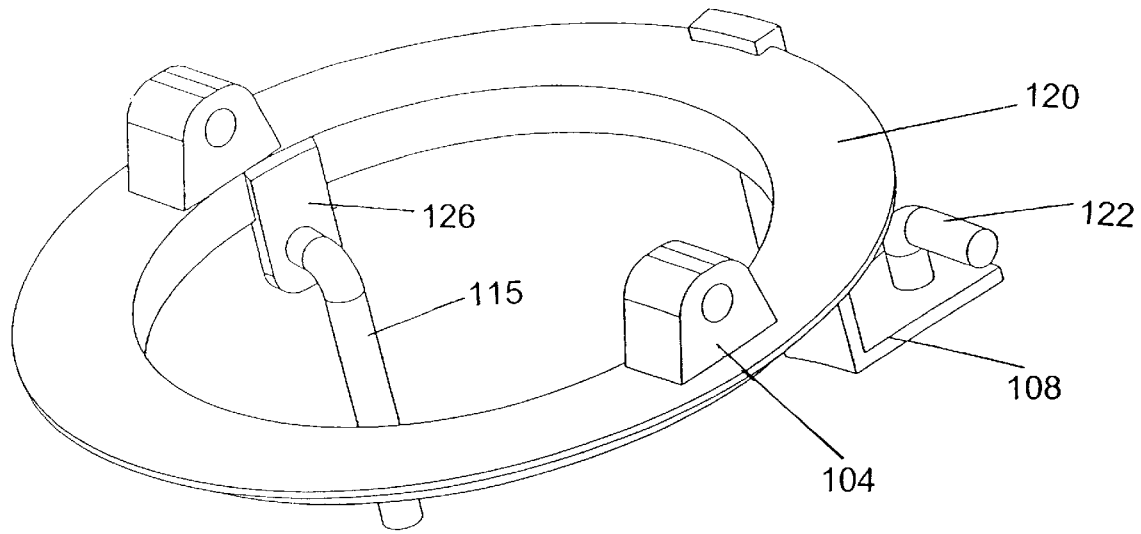
FIG. 10 is a detailed perspective view of the rotational mechanism of the present invention.
Figure 11:
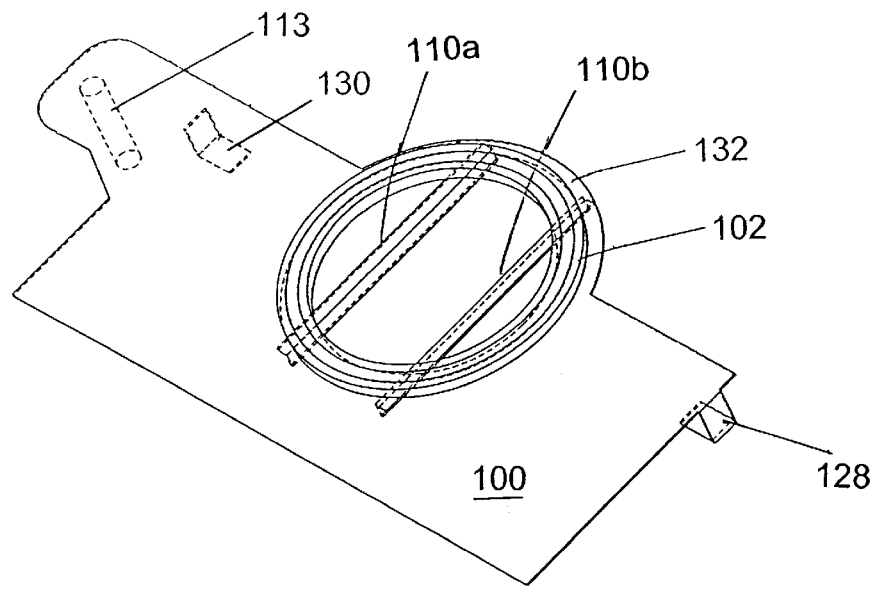
FIG. 11 is a detailed view of the rotational track platform of the present invention.

Reference is now made to FIGS. 10 and 11 for a more detailed description of the rotational components and the support points for the display platform of the present invention. FIG. 10 shows in detail the structure of swivel ring (120) and the various attachment points contained thereon. The display platform (not shown) is positioned on pivot hinges (104) as a primary means of support. The rotation of swivel ring (120) is controlled through the motion of the swivel actuator (not shown) as is attached to swivel connector rod (115) through swivel ring connector (126). As indicated above, the tilt actuator (not shown) is supported and held on swivel ring (120) by way of tilt actuator support (108). Tilt actuator support (108) pivotally holds the tilt actuator (not shown) in place by means of tilt connector rod (122). It can be appreciated that the tilt motion of the platform will require the pivotal attachment of tilt actuator (106) to tilt connector rod (122).

In FIG. 11, swivel base platform (100) is shown absent all removable components. Right arm clip (128) and left arm clip (130) are positioned and structured to partially surround and attach to the right and left extension arms (not shown). Bearing track (102) is shown as it surrounds an aperture in swivel base platform (100). A portion of bearing track (102) is supported by bearing track platform (132) which extends beyond the limits of the bulk of swivel base platform (100). This is required because swivel base platform (100) must rotate from side to side about a center line in the middle of bearing track (102). Swivel braces (110a) and (110b) are shown as they structurally support bearing track platform (132). It can be appreciated that the weight of the display device, which is focused on pivot hinges (104) and tilt actuator (106), is transferred to bearing track (102).

Reference is now made to FIGS. 12a through 12c for an overview of the various positioning capabilities of the present invention. In FIG. 12a, the display device is rotated on display platform (28) to a full right position. It is noted that the only component of the present invention that moves with the display device is display platform (28). All other components remain stationary in their forward facing configuration.

Likewise when display device is centered, as shown in FIG. 12b, display platform (28) moves to a position aligned with the rectangular components of positioning system (10).

FIG. 12c shows the continued rotation of the display device on display platform (28) to its left most rotational position.

It can be appreciated from the view in FIG. 7 that the overall height adjustment of the display device can be accomplished through the motion of the lift actuator of the present invention. The vertical lift motion provided by the system of the present invention raises and lowers the entire display platform and the display device positioned thereon. This is accomplished without altering the position of the center of gravity for the display device from a point immediately over the center of the base frame. It can likewise be appreciated from FIG. 7 the manner of implementing the third degree of motion related to the tilt angle for the display device. As tilt actuator (106) raises and lowers the backside of display platform (28), the display device is tilted forward or back according to the user's requirements. It can be appreciated that a motion limiting device, as is well known in the art, can be incorporated in association with display platform (28) to prevent the excessive tilt forward or back of the platform. Such limit devices could be limit switches appropriately positioned adjacent display platform (28) or could be devices that limit the actual rotation and thus the extension of tilt actuator (106).

Similar limiting devices could be incorporated in conjunction with lift actuator (30) to prevent the excessive motion vertically up or vertically down for the support frame of the present invention. Limit switches could be positioned in conjunction with a lower portion of swivel base platform (100) so as to terminate a lift motion when contact is made. Likewise, as is well known in the art, limit switches could be replaced by proximity sensors to permit movement only to within a certain distance from the top of base cabinet (14). This would prevent the inadvertent crushing of objects between base cabinet (14) and swivel base platform (100) upon downward vertical motion.

Referencing again FIG. 9, as well as FIGS. 12a through 12c, it can be appreciated that various safety devices could be incorporated into the system of the present invention in order to prevent excessive rotational motion and/or inadvertent contact with obstructions that might fall between the display device and safety shield (20). Limit switches appropriately positioned on display platform (28) could terminate rotational motion when a full right or full left position is attained. Likewise, proximity sensors could be used to terminate this motion either when the limits of the motion are reached or when obstructions are inadvertently placed in the path of the rotational motion. Thus, while safety shield

(20) is intended to prevent the insertion of obstructions too close to the display device while rotation occurs, proximity sensors could prevent such motion when obstructions are inadvertently encountered.

Whereas the primary inventive features of the present invention lie in the structural configuration and the mechanisms for actuating motion, it can be appreciated that the electrical connections and the remote control transmitter and receiver devices which are not shown in the enclosed figures could be easily incorporated at a number of points on the structure of the present invention. The cabinetry, for example, comprised of base cabinet (14) in the preferred embodiment, could easily serve to house the necessary electronics associated with both the remote control receiver and the wired connections to the various electrical actuators. In each case, with the rotational actuator, the tilt actuator and the vertical lift actuator, a simple pair of electrical conductors to direct current to the motors which drive these actuators would be sufficient to provide the necessary control. Likewise, each of the limit switches and proximity sensors described above as safety features would require small two conductor leads back to a central control box for operation. Such conductors, control boxes, and remote control transmitters and receivers are well known in the art and would be easily implemented and installed in a variety of configurations in the present invention. The only specific requirement associated with the conductors described would involve those conductors which control motion on the display platform and which would be loosely connected between the display platform and the immobile base structure. In other words, a flexible loop of conductor would have to be positioned on lift actuator (30) in order to accommodate a fully extended lift actuator.

As indicated above, it can be appreciated that the fundamental components of the present invention could be easily used in conjunction with a variety of different display devices. The present invention has been described as it would be applied to use in conjunction with a typical home television set so as to provide versatility of movement and orientation for the television set when viewed. Various other display devices could likewise be utilized in conjunction with the fundamental components of the present invention with slight modifications to the structures and mechanisms described.

What is claimed is:

1. A system for the support and positioning of a display device, capable of varying the position and orientation of the display device by remote operation, said system comprising:
    a free standing and mobile base frame;
    a lift actuator positioned on said free standing base frame and directed generally perpendicular to said base frame;
    a support frame positioned on and attached to said lift actuator;
    a display platform positioned above said base frame and retained and supported on said support frame, said display platform comprising:
    a swivel base;
    a swivel actuator;
    a tilt actuator; and
    a display table, said display table pivotally mounted to said swivel base and said tilt actuator; and
    a safety shield positioned on said support frame for partially surrounding a display device positioned on said display table.

2. The support and positioning system of claim 1 wherein said base frame comprises a plurality of interchangeable components of varying lengths wherein components of a first length may be substituted in said base frame for components of a second length in a manner that alters the overall dimensions of said base frame so as to accommodate display devices of larger or smaller dimensions.

3. The support and positioning system of claim 1 wherein said support frame comprises a first and a second extensible arm, said first and second extensible arms positioned to retain and support said display platform, said extensible arms serving to vary the center of gravity of a display device so as to position said center of gravity over the geometric center of said base frame.

4. The support and positioning system of claim 1 wherein said swivel base of said display platform comprises:
    a circular bearing track;
    a first and a second pivot hinge connecting said display table to said swivel base; and
    a swivel actuator connector rod, said connector rod connecting said circular bearing track with said swivel actuator.

5. The support and positioning system of claim 1 wherein said tilt actuator of said display platform is integrally mounted to said swivel base so as to move in conjunction with said swivel base and said display table pivotally mounted to said swivel base.

6. The support and positioning system of claim 1 wherein said lift actuator comprises an electric motor-driven helical screw that extends upon rotation of said electric motor in a first direction and retracts upon rotation of said electric motor in an opposite direction.

7. The support and positioning system of claim 1 wherein said swivel actuator comprises an electric motor-driven helical screw that extends upon rotation of said electric motor in a first direction and retracts upon rotation of said electric motor in an opposite direction.

8. The support and positioning system of claim 1 wherein said tilt actuator comprises an electric motor-driven helical screw that extends upon rotation of said electric motor in a first direction and retracts upon rotation of said electric motor in an opposite direction.

9. The support and positioning system of claim 1 wherein movements defined by said lift actuator, said swivel actuator, and said tilt actuator are each limited by means for ceasing operation of said actuators upon movement of said system to preset range limits, said limits set to prevent excessive movement of said system in a manner that would damage said display device or obstructions positioned in proximity to said display device.

* * * * *